2,916,915
MEAT TESTER

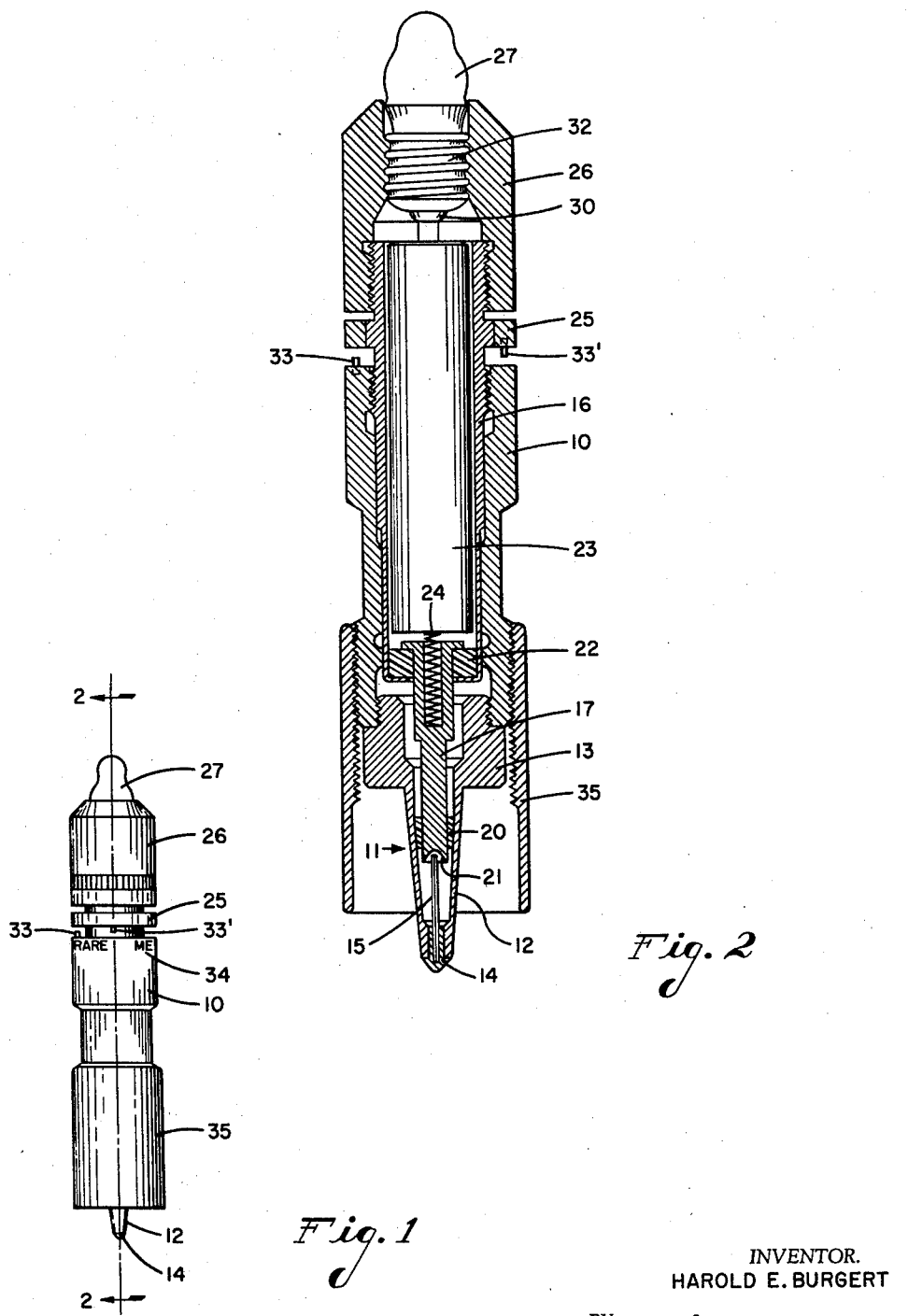

Harold E. Burgert, Rochester, N.Y., assignor of small percentages to various assignees Application December 26, 1957, Serial No. 705,165

5 Claims. (Cl. 73—352)

This invention relates to a device that may be used in the home and elsewhere to indicate the degree to which a steak or a piece of meat of limited thickness has been cooked.

Cooking meat has always been an art rather than a science because previously available means for determining the temperature of meat have never been popularly accepted by housewives and chefs. Many types of meat temperature indicators are available but none has ever had widespread acceptance.

Glass thermometers are probably the most accurate instruments available for this purpose, but these have never been widely used, probably because of the natural fear that the thermometer might break in use. Metal sheathed glass thermometers, and metallic instruments that have bimetallic heat-sensitive elements, have had limited use in connection with large cuts of meat, where they can be inserted and left in the meat during cooking. However, no accurate, convenient, and simple meat thermometer is available that can be used conveniently and safely for smaller cuts of meat.

One object of the present invention is to provide a testing device for indicating the degree to which meat has been cooked, that is sturdy, accurate, and convenient, and that can be used with small cuts of meat.

Another object of the invention is to provide a testing device for determining the extent to which a thin cut of meat has been cooked and that is particularly adapted for use in the home, or at a home grill.

Another object of the invention is to provide a device of the character described which will have a quick response, that is, a relatively short measuring cycle.

Another object of the invention is to provide a device of the character described that will operate easily, that is easy to clean, and that is characterized by long life.

Still another object of the invention is to provide a device of the character described that is light in weight and direct reading.

A related object of the invention is to provide a device of the character described that can be used without marring the appearance of the meat that is tested.

Another related object of the invention is to provide a device of the character described that can be easily adjusted so that it will determine the degree to which meat has been cooked substantially at the center of thickness of the meat.

Other objects of the invention will become apparent to those skilled in the art from a consideration of the following detailed description of one embodiment of the invention, taken together with the drawing.

In the drawing:

Fig. 1 is a side elevation of a meat tester constructed according to one embodiment of the invention; and Fig. 2 is an axial section thereof, on an enlarged scale, taken on the line 2—2 of Fig. 1, looking in the direction of the arrows.

Referring now in detail to the drawing, the meat tester comprises a generally cylindrical body 10 that is threaded both externally and internally adjacent its lower end. A probe 11 is mounted in the lower end of the body 10. The probe includes a portion 13 that is screwed into the end of the body 10, and a conical, elongate portion 12, that is sharply tapered so that it can be easily inserted in a cut of meat, and that projects downwardly from the portion 13 in axial alignment with the body 10. The body 10 is made preferably of a lightweight metal, such as aluminum. The probe is tubular, and has a plug 14 made of a material that has good thermal conductivity, such as, for example, copper or silver, inserted in its tip. A bimetallic element 15 is secured at its lower end to the tip 14 with its upper end projecting freely and directly upwardly into the bore of the probe portion 12. At room temperature, the bimetallic element 15 extends upwardly substantially axially of the probe.

A sleeve 16 is mounted within the body 10 and is threaded into the body 10 at the upper end thereof. The sleeve 16 is substantially closed at its lower end, and supports a nylon insulating bushing 22. A metallic contact stud 17 is mounted in this bushing to project axially from the lower end of the sleeve 16 into the bore of the probe 11. The lower end of the contact stud 17 is mounted in an insulating bushing 20 to prevent electrical and physical contact between the stud and the probe. The lower face 21 of the contact stud 17 is concaved so that the upper end of the bimetallic element 15 projects into the recess thus formed in the lower face 21 of the stud. The bushing 20 serves to maintain the contact stud 17 coaxial with the bore of the probe part 12. This is essential to get the required accuracy of temperature indication when the device is in use. With the short bimetallic element 15 and with the stud 17 held by bushing 20 coaxial with the bore of part 12, the accuracy of indication will not be affected by any sloppiness between the interengaging threads of parts 10 and 16, nor by an accidental blow to the device or by normal bending of the probe 11 with respect to the body 10. The use of a short bimetallic element 15 is only possible through maintenance of absolute concentricity of stud 17 and part 12; and bushing 20 serves the purpose of maintaining this concentricity as well as the purpose of insulating stud 17 from the probe.

A dry cell battery 23 is disposed within the bore of the sleeve 16. The cell 23 is a conventional type that has its two terminals at opposite ends thereof. A metallic contact spring 24 is engaged in a recess in the contact stud 17, and is disposed to engage against the bottom surface of the dry cell 23 to make electrical contact between the lower terminal of the cell and the stud 17.

The upper end of the sleeve 16 projects from the body 10. A ring 25 is rigidly secured to the sleeve 16 in axially-spaced relation above the upper end of the body 10. A metallic cap 26 is screwed onto the upper end of the sleeve 16 in axially-spaced relation above the indicating ring 25. The cap 26 is formed with a socket, and a lamp 27 is screwed into the socket, with one electrical terminal 30 thereof disposed in engagement with the upper terminal of the dry cell 23. The second terminal in the lamp is connected to its threaded base 32, which makes an electrical connection through the socket with the cap 26, and thence through the sleeve 16, body 10, probe 11, probe tip 14, bimetallic element 15, stud 17, and spring 24 with the lower terminal of the battery 23 when the circuit is closed by engagement of bimetallic element 15 with face 21 of stud 17.

An adjusting pin 33 is secured in the upper end of the body 10 to project upwardly toward the ring 25. Another pin 33' is mounted in the lower face of the ring 25, to project downwardly toward the body 10. The outer surface of the body 10, immediately below the pin 33, is marked with indicating indicia 34 (Fig. 1) that is descriptive of the "doneness" of the meat, that is, of the extent to which meat has been cooked, such as, for example, the words "rare," "medium," and "well," "well" denoting "well-done."

Preferably, the body 10, ring 25, and cap 26 have the same outer diameter, for ease in handling and storing the device when it is not in use.

A sleeve 35 is threaded onto the lower end of the body 10 and is disposed so that the lower end thereof projects downwardly around the probe, to act as a stop to limit the penetration of the probe into the meat whose "doneness" is to be tested.

From the foregoing description of the structure of the device, it will be understood that the lower face 21 of the contact stud 17 is normally spaced from the upper end of the bimetallic element 15. The spacing of the face 21 from the bimetallic element 15 determines how far the element must bend before it strikes the face 21, and closes the electrical circuit to the lamp bulb 27. When the face 21 is spaced furthest from probe tip 14, the steak will be well done before the bulb 27 is illuminated. When the face 21 is closest to the probe tip 14, the steak will be rare when the bulb is lighted. To move the face 21 of the contact stud toward or away from the upper end of the bimetallic element 15, the body 10 is held stationary while the ring 25 is rotated, to thread the sleeve 16 into or out of the body 10. As the sleeve 16 is rotated, the contact stud 17 is moved toward or away from the upper end of the bimetallic element 15, depending upon the direction in which the ring 25 is rotated.

When the bimetallic element 15 and the lower face 21 of the contact stud 17 are in physical and electrical contact, a circuit is completed from the lower terminal of the cell 23, through the spring 24, the contact stud 17, the bimetallic element 15, the probe tip 14, the probe portion 12 and probe portion 13, the body 10, the sleeve 16, the cap 26, and the lamp terminal 30 to the upper terminal of the battery 23. The lamp will thus be illuminated whenever the bimetallic element 15 is in contact with the lower face 21 of the contact stud 17.

To use the device for testing the degree to which meat has been cooked, the sleeve 35 is adjusted to expose a length of the probe portion 12 that corresponds to approximately one-half of the thickness of the cut of meat that is being cooked. When this adjustment has been made, the lower surface of the sleeve 35 will engage against the surface of the meat when the probe is plunged into the meat, and the probe tip 14 automatically will be positioned at approximately the center of thickness of the cut of meat.

When meat is being cooked on a pan, griddle, grill, or in a broiler, one side of the cut of meat is cooked first, and then it is turned over. To test the "doneness" of the meat, the meat is temporarily moved away from the source of heat and turned so that the hot side of the meat is available. After the sleeve 35 has been adjusted for the thickness of the cut of meat, the probe is then plunged into the meat. The bimetallic element quickly assumes approximately the same temperature as the meat, and it bends away from the vertical, so that its upper end approaches the sides of the recessed face 21 of the contact stud 17. The body 10 is then held firmly in one hand, and the ring 25 is turned to rotate the sleeve 16, to cause the contact stud 17 to be moved into electrical contact with the tip of the bimetallic element 15, to complete the electrical circuit and light the lamp 27. As soon as the lamp lights up, the instrument is removed from the cut of meat, and the position of the indicating pin 33' with respect to the indicia 34 on he body or barrel 10 will indicate the degree to which meat has been cooked.

The lower pin 33 simply functions as a stop for the upper pin 33' and limits rotation of the sleeve 16 relative to the body 10 in both directions.

The instrument is easily cleaned simply by running water over the probe 12 and over the lower end of the sleeve 35. Preferably, the instrument is made from light weight materials so that it can be handled easily. For example, the metallic parts of the device can be aluminum or some other suitable light-weight metal, although the sleeve 16 preferably is made of brass. The insulating washers may be made from molded nylon or other suitable material.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. A testing device for indicating the extent to which meat has been cooked, comprising a first body providing means for grasping said device, a heat-conducting elongate probe mounted on said body and adapted to be plunged into the meat, a temperature sensitive element disposed in said probe and operatively connected thereto and mounted to deflect in proportion to the temperature of said element, a second body telescopically disposed within said first body and threaded thereto for axial movement relative thereto, contact means secured to said second body and normally disengaged from said element and movable to engage said element to measure said deflection upon axial movement of said second body relative to said first body, indicating means mounted on one body and cooperating indicia disposed on the other body, said indicia being calibrated to indicate the extent to which the meat has been cooked as determined by the measured deflection of said element.

2. A testing device for indicating the extent to which meat has been cooked, comprising a first body providing means for grasping said device, a heat-conducting elongate probe mounted at one end of said body and adapted to be plunged into the meat, a temperature sensitive bimetallic element disposed in said probe and operatively connected thereto and mounted to deflect in proportion to the temperature of said element, a second body telescopically disposed within said first body and threaded thereto for axial movement relative thereto, a contact stud secured to said second body in normally disengaged relation to said element and movable to engage said element to measure the deflection thereof upon axial movement of said second body relative to said first body, an electrical cell disposed within said second body with one terminal thereof electrically connected to said stud, a lamp mounted in said device, said element being electrically connected through the filament of said lamp with the opposite terminal of said cell, indicating means mounted on one said body and cooperating indicia disposed on the other said body, said indicia being calibrated to indicate the extent to which the meat has been cooked as determined by the measured deflection of said bimetallic element.

3. A device for indicating the extent to which meat has been cooked, comprising a body, a heat-conducting probe mounted on said body at one end thereof, said probe being hollow and having a metallic tip of high thermal conductivity, a temperature-sensitive, electrically-conductive bimetallic element mounted inside said probe and operatively connected at one end to said tip, the opposite end of said bimetallic element being free to deflect in proportion to the temperature of said element, a sleeve mounted on said body to surround said probe and adjustable axially of said body to determine the length of probe which is exposed, thereby to determine the distance which the probe is plunged into the meat, a battery in said body, an electrically-operated signal device carried by said body, an electrically-conductive contact member mounted in said body above said bimetallic element and having a concave lower face confronting said bimetallic element, said contact member being adjustable axially of said body toward and away from said bimetallic element, said contact member and said bimetallic element being connected to said battery and to said signal device to close a circuit to said signal device when said contact member engages said bimetallic element, and means on said body for indicating the extent of adjustment of said contact member made to bring said contact member into engagement with said bimetallic element.

4. A testing device for indicating the extent to which meat has been cooked, comprising a body, a hollow, heat-conducting, elongate probe mounted on said body at one end thereof and adapted to be plunged into the meat, a temperature-sensitive bimetallic element disposed in said probe and operatively connected thereto, a contact stud mounted in said body to extend into said probe to be adjustable axially therein toward and away from said bimetallic element, said contact stud having a face opposed to said bimetallic element and adapted to be brought into engagement with said element upon adjustment of said stud toward said element, an electrically-operated signal carried by said body, means connecting said stud electrically to said signal to actuate said signal when said stud is in contact with said bimetallic element, and means for indicating the extent of adjustment of said stud to effect said contact, said last-named means being calibrated to indicate the extent to which the meat has been cooked.

5. A testing device according to claim 4 in which the face of said stud, which is opposed to said bimetallic element, is concave, and in which means is provided for maintaining said stud coaxial with said probe throughout adjustment of the stud relative to the bimetallic element.

References Cited in the file of this patent

UNITED STATES PATENTS

| 2,154,426 | Adams | Apr. 18, 1939 |
| 2,820,130 | Dadson | Jan. 14, 1958 |
| 2,858,699 | Scofield et al. | Nov. 4, 1958 |

FOREIGN PATENTS

| 560,829 | Germany | Oct. 7, 1932 |
| 556,575 | Great Britain | Oct. 11, 1943 |